(12) United States Patent
Kikuta et al.

(10) Patent No.: US 10,472,488 B2
(45) Date of Patent: Nov. 12, 2019

(54) TRANSPARENT RESIN COMPOSITION AND HEAT RAY-SHIELDING FILM

(71) Applicant: SUMITOMO OSAKA CEMENT CO., LTD., Tokyo (JP)

(72) Inventors: Ryo Kikuta, Tokyo (JP); Keisuke Maeda, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 84 days.

(21) Appl. No.: 15/558,564

(22) PCT Filed: May 10, 2016

(86) PCT No.: PCT/JP2016/063921
§ 371 (c)(1),
(2) Date: Sep. 15, 2017

(87) PCT Pub. No.: WO2016/185951
PCT Pub. Date: Nov. 24, 2016

(65) Prior Publication Data
US 2018/0057655 A1    Mar. 1, 2018

(30) Foreign Application Priority Data
May 15, 2015    (JP) ................................ 2015-100460

(51) Int. Cl.
*C08K 3/22* (2006.01)
*C08J 7/04* (2006.01)
*C08L 101/12* (2006.01)

(52) U.S. Cl.
CPC ................ *C08K 3/22* (2013.01); *C08J 7/047* (2013.01); *C08L 101/12* (2013.01); *C08J 2367/02* (2013.01); *C08J 2433/04* (2013.01); *C08K 2003/2231* (2013.01); *C08K 2201/006* (2013.01); *C08K 2201/011* (2013.01); *C08K 2201/019* (2013.01)

(58) Field of Classification Search
CPC .............. C08K 3/22; C08K 2003/2231; C08K 2201/006; C08K 2201/011; C08K 2201/019; C08G 77/14; C08J 7/047; C08J 2367/02; C08J 2433/04; C08L 101/12

USPC .......................................................... 524/399
See application file for complete search history.

(56) References Cited

U.S. PATENT DOCUMENTS

| | | | |
|---|---|---|---|
| 5,518,810 A | 5/1996 | Nishihara et al. | |
| 7,374,743 B2 | 5/2008 | Katusic et al. | |
| 7,952,805 B2 | 5/2011 | McGurran et al. | |
| 2008/0075936 A1* | 3/2008 | McGurran ............ | B29C 55/023 428/212 |

FOREIGN PATENT DOCUMENTS

| | | |
|---|---|---|
| JP | H04-275377 | 9/1992 |
| JP | H0769632 | 3/1995 |
| JP | 2002138271 | 5/2002 |
| JP | 2003215328 | 7/2003 |
| JP | 2004284904 | 10/2004 |
| JP | 2006521268 | 9/2006 |
| JP | 2007084605 | 4/2007 |
| JP | 2010163525 | 7/2010 |
| JP | 2013224046 | 10/2013 |

OTHER PUBLICATIONS

Kazuo Sunahara et al., "Thermal Insulation and Solar Control by Functional Glass", with partial English translation thereof, Journal of the Society of Inorganic Materials, Apr. 2007, pp. 403-409.
"International Search Report (Form PCT/ISA/210)", dated Jul. 12, 2016, with English translation thereof, pp. 1-4.
"Office Action of Japan Counterpart Application," dated Jul. 13, 2017, with English translation thereof, p. 1-p. 6.

* cited by examiner

*Primary Examiner* — Ling Siu Choi
*Assistant Examiner* — Ronald Grinsted
(74) *Attorney, Agent, or Firm* — JCIPRNET

(57) ABSTRACT

Provided is a transparent resin composition having a higher heat ray-shielding effect that can particularly effectively shield light of a wavelength of 1,450 nm to 1,750 nm while ensuring a high visible light transmittance. The transparent resin composition contains a transparent resin-forming component and inorganic particles, in which the inorganic particles contain indium tin oxide (ITO) and have a color having an L* value of 30 or more and 55 or less and a b* value of −18 or more and −10 or less in the Lab color space.

5 Claims, 1 Drawing Sheet

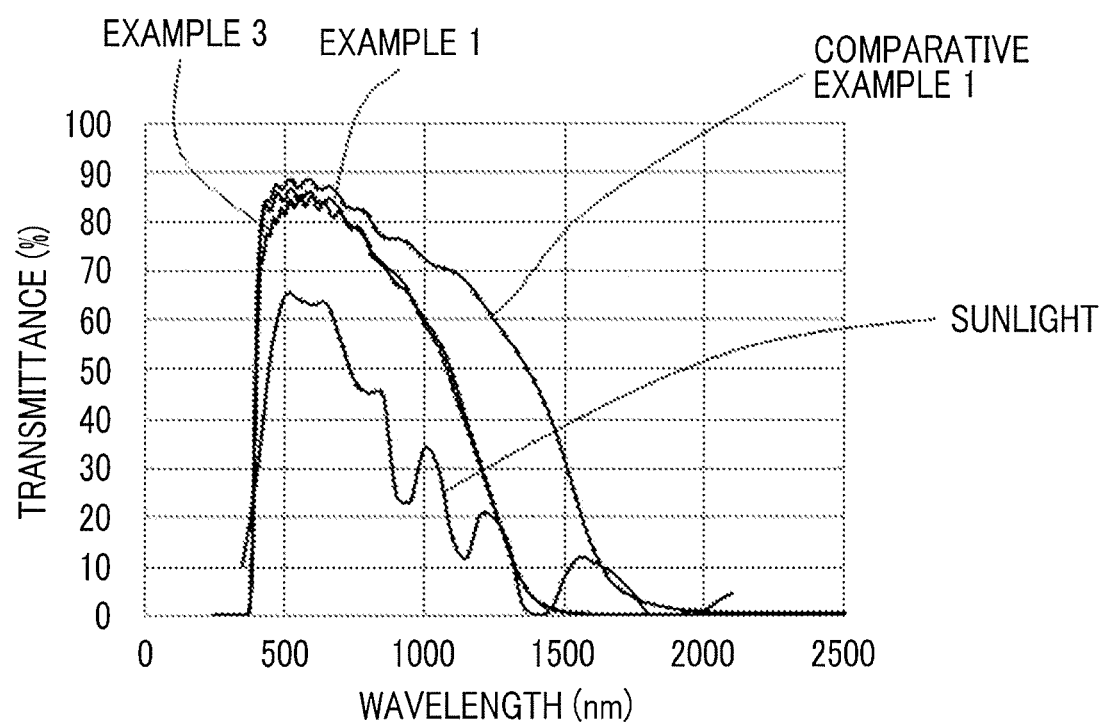

TRANSPARENT RESIN COMPOSITION AND HEAT RAY-SHIELDING FILM

CROSS-REFERENCE TO RELATED APPLICATION

This application is a 371 application of the international PCT application serial no. PCT/JP2016/063921, filed on May 10, 2016, which claims the priority benefit of Japan application no. 2015-100460, filed on May 15, 2015. The entirety of each of the above-mentioned patent applications is hereby incorporated by reference herein and made a part of this specification.

TECHNICAL FIELD

The present invention relates to a transparent resin composition and a heat ray-shielding film.

BACKGROUND ART

The window glass used in automobiles, houses, and the like transmits both the visible light and the infrared light emitted from the sun and the like, and hence the internal temperature of the automobiles or the houses rise. Accordingly, lots of energy needs to be used to control the internal temperature. Therefore, a heat ray-shielding film which transmits visible light but shields infrared light is bonded to the window glass so as to prevent the rise of the internal temperature.

As a heat-ray shielding material used in the heat ray-shielding film, a heat ray-shielding coating composition is used which is obtained by dispersing metal oxide particles reflecting•absorbing heat rays, such as tin oxide, antimony-doped tin oxide (ATO), and tin-doped indium oxide (indium tin oxide, ITO) or an organic compound shielding heat rays, such as a phthalocyanine compound, in a transparent resin such as an acrylic resin, a methacrylic resin, an epoxy resin, a urethane resin, a polyester resin, or a polystyrene resin (for example, Patent Literature No. 1).

The heat ray-shielding coating composition is prepared by mixing together a cross-linkable compound having a methacryloyl group or an acryloyl group as a reactive functional group, metal oxide particles or metal composite oxide particles such as antimony tin oxide (ATO), indium tin oxide (ITO), or vanadium oxide, a polymerization initiator, and a dispersant so as to obtain a coating composition. Therefore, in a case where the coating composition is cured, a polymerization reaction poorly occurs between the cross-linkable compound and the surface of the metal oxide particles or the metal composite oxide particles. Accordingly, the heat-ray shielding properties, transparency, and abrasion resistance of the obtained coating material deteriorate. Particularly, in a case where heat ray-shielding properties are imparted to the surface of front glass or window glass, unfortunately, transparency and abrasion resistance are not sufficiently obtained.

The physiological discomfort (hereinafter, referred to as "scorching sensation" in some cases) the skin feels as if it is scorched when being irradiated with light is greatly affected by infrared rays of a wavelength of 1,500 nm to 2,100 nm (for example, Non Patent Literature No. 1). Within the above wavelength region, sunlight (solar radiation light) has a certain intensity at a wavelength of 1,450 nm to 1,750 nm. Accordingly, particularly by shielding infrared rays of a wavelength of 1,450 nm to 1,750 nm, the scorching sensation can be suppressed. Therefore, there is a demand for a resin composition and a heat ray-shielding film exhibiting heat ray-shielding properties within the aforementioned wavelength region.

CITATION LIST

Patent Literature

[Patent Literature No. 1] Japanese Laid-open Patent Publication No. 2007-84605

Non Patent Literature

[Non Patent Literature No. 1] Kazuo Sunahara et al., "Thermal Insulation and Solar Control by Functional Glass", Journal of the Society of Inorganic Materials, Japan 14, 403-409 (2007)

SUMMARY OF INVENTION

Technical Problem

The present invention aims to solve the aforementioned various problems of the related art and to achieve the following object. That is, the object of the present invention is to provide a transparent resin composition having a higher heat ray-shielding effect that can particularly effectively shield light of a wavelength of 1,450 nm to 1,750 nm while ensuring high visible light transmittance, and to provide a heat ray-shielding film.

Solution to Problem

Means for solving the above problems are as below.

<1> A transparent resin composition containing a transparent resin-forming component and inorganic particles, in which the inorganic particles contain indium tin oxide (ITO) and have a color having an L* value of 30 or more and 55 or less and has a b* value of −18 or more and −10 or less in the Lab color space.

<2> The transparent resin composition described in <1>, in which a specific surface area of the inorganic particles is 20 m$^2$/g to 50 m$^2$/g.

<3> The transparent resin composition described in any one of <1> and <2>, in which a median value $d_{50}$ of dispersed-particle diameters of the inorganic particles is 200 nm or less.

<4> The transparent resin composition described in any one of <1> to <3>, in which a content of the inorganic particles is 5% by volume or more and 40% by volume or less with respect to an amount of nonvolatile components in the transparent resin composition.

<5> The transparent resin composition described in any one of <1> to <4>, in which in a case where volatile components are removed and a measurement length is set to be 1 μm, a visible light transmittance is 80% or more, and a light transmittance at a wavelength of 1,450 nm to 1,750 nm is 30% or less.

<6> A heat ray-shielding film having a visible light transmittance of 70% or more, a light transmittance at a wavelength of 1,450 nm to 1,750 nm is 30% or less, and a haze value of 5% or less.

<7> The heat ray-shielding film described in <6> that is formed of the transparent resin composition described in any one of <1> to <5>.

Advantageous Effects of Invention

According to the present invention, it is possible to solve the aforementioned various problems of the related art, to achieve the above objects, to provide a transparent resin composition having a higher heat ray-shielding effect that can particularly effectively shield light of a wavelength of 1,450 nm to 1,750 nm while ensuring high visible light transmittance, and to provide a heat ray-shielding film.

BRIEF DESCRIPTION OF DRAWINGS

FIG. 1 is a view showing the light transmittance of Examples 1 and 3 and Comparative Example 1 measured at 250 nm to 2,500 nm and the intensity distribution of sunlight (solar radiation light) on the ground.

DESCRIPTION OF EMBODIMENTS (Transparent Resin Composition)

The transparent resin composition of the present invention contains a transparent resin-forming component and inorganic particles and additionally contains other components if necessary.

<Inorganic Particles>

The inorganic particles are particles having a color that has an L* value and a b* value which is within a specific range of numerical values in the Lab color space.

The Lab color space is one of the color describing methods, which is established in 1976 by Commission Internationale de l'Eclairagede (CIE). In the Lab color space, a stimulating strength of a color light causing color sensation is physically measured and described as luminance (L* value), a position between magenta and green (a* value), and a position between yellow and blue (b* value). In a case where the L* value is 0, it shows that the color is black, and in a case where the L* value is 100, it shows that the color is white. In a case where the a* value is negative, it shows that the color is close to green, and in a case where the a* value is positive, it shows that the color is close to magenta. In a case where the b* value is negative, it shows that the color is close to blue, and in a case where the b* value is positive, it shows that the color is close to yellow.

The L* value of the inorganic particles is 30 or more and 55 or less, preferably 32 or more and 50 or less, and more preferably 35 or more and 45 or less. The b* value of the inorganic particles is −18 or more and −10 or less, preferably −17 or more and −11 or less, and more preferably −16 or more and −11 or less. The a* value of the inorganic particles is preferably −7.1 or more and −4.6 or less, and more preferably −7.0 or more and −4.9 or less.

The measurement method using the Lab color space is specified in the Japan Industrial Standards JIS Z 8781-4: 2013, and can be performed using a spectral colorimeter which is a measurement instrument based on the measurement method, such as SE2000 manufactured by Konica Minolta, Inc., SD7000 manufactured by NIPPON DENSHOKU INDUSTRIES CO., Ltd, or the like.

The inorganic particles have the aforementioned color and contain indium tin oxide (ITO). That is, the inorganic particles are particles containing particles formed of indium tin oxide (IT) or particles containing indium tin oxide (ITO) and other components (for example, antimony tin oxide (ATO), cesium-containing tungsten oxide, aluminum-containing zinc oxide, gallium-containing zinc oxide, and niobium-containing titanium oxide). The content of indium tin oxide (ITO) in the inorganic particles is preferably 50% by mass or more, more preferably 80% by mass or more, and even more preferably 90% by mass or more.

The inorganic particles preferably have conductivity, and are more preferably conductive particles having a free electron density of $10^{20}/cm^3$ or more and $10^{22}/cm^3$ or less.

The color of the inorganic particles can be changed by calcinating the inorganic particles in a reducing atmosphere, and can be regulated by appropriately selecting the reductive calcination conditions. Examples of the reductive calcination conditions include calcination temperature, calcination time, type and amount (concentration) of reducing gas, and the like. Examples of the reducing gas include hydrogen, carbon monoxide, and the like.

The average primary particle diameter of the inorganic particles is preferably 3 nm or more and 100 nm or less, more preferably 5 nm or more and 75 nm or less, and even more preferably 7 nm or more and 40 nm or less.

In a case where the average primary particle diameter of the inorganic particles is 3 nm or more and 100 nm or less, a median value $d_{50}$ of dispersed-particle diameters of the inorganic particles in the transparent resin composition and the heat ray-shielding film can be rendered to be 200 nm or less, and the transparency of the transparent resin composition and the heat ray-shielding film and the abrasion resistance of the heat ray-shielding film can be improved.

The average primary particle diameter is the average of the particle diameter of each of the inorganic particles.

As the method for measuring the average particle diameter, a method can be exemplified in which the particle diameter of each of the inorganic particles is measured using a scanning electron microscope (SEM), a transmission electron microscope (TEM), or the like and calculating the average of the particle diameter. The number of inorganic particles measured is preferably 100 or more, and more preferably 500 or more.

The specific surface area of the inorganic particles is preferably 20 $m^2/g$ or more and 50 $m^2/g$ or less, and more preferably 20 $m^2/g$ or more and 45 $m^2/g$ or less. In a case where the specific surface area of the inorganic particles is 20 $m^2/g$ or more and 50 $m^2/g$ or less, the average primary particle diameter of the inorganic particles can fall into the aforementioned range.

The specific surface area can be measured using the BET method. As a measurement instrument for the BET method, for example, it is possible to use BELSORP-miniII manufactured by Nippon Bel Corporation, ASAP 2020 manufactured by Shimadzu Corporation, and the like.

The median value $d_{50}$ of the dispersed-particle diameters of the inorganic particles is preferably 200 nm or less, more preferably 100 nm or less, and even more preferably 50 nm or less. In a case where the median value $d_{50}$ of the dispersed-particle diameters of the inorganic particles is 200 nm or less, it is possible to inhibit the scattering of visible light in the transparent resin composition and to obtain a transparent resin composition excellent in visible light-transmitting properties.

In a case where the median value $d_{50}$ of the dispersed-particle diameters is 200 nm or less, the average dispersed-particle diameter of the inorganic particles in the heat ray-shielding film obtained by curing the transparent resin composition can be rendered to be 500 nm or less and preferably rendered to be 200 nm or less. As a result, the haze value of the heat ray-shielding film can be rendered to be 5% or less. Furthermore, the reduction in the film strength resulting from an excess of agglomerated particles can be prevented, and hence a heat ray-shielding film excellent in abrasion resistance can be obtained.

The median value $d_{50}$ of the dispersed-particle diameters can be measured as a particle diameter distribution of dispersed particles in a dispersion, by a dynamic light scattering method or a laser diffraction•scattering method. Particularly, in a case where nanometer-sized particles are measured, it is preferable to use a dynamic light scattering method. The median value $d_{50}$, which is a value obtained by integrating the dispersed-particle diameters and represented in percentage, can be calculated from the obtained particle diameter distribution. As a particle diameter distribution analyzer using the dynamic light scattering method, for example, it is possible to use nano Partica SZ-100 manufactured by HORIBA, Ltd., Microtrac 9340-UPA manufactured by NIKKISO CO., LTD., and the like.

The content of the inorganic particles is, with respect to the amount of components remaining after removing volatile components such as a solvent from the transparent resin composition (hereinafter, referred to as "nonvolatile components in the transparent resin composition" in some cases), preferably 5% by volume or more and 40% by volume or less, and more preferably 10% by volume or more and 30% by volume or less.

In a case where the content of the inorganic particles is within a range of 5% by volume or more and 40% by volume or less, the heat ray-shielding film obtained by curing the transparent resin composition can have excellent visible light-transmitting properties and properties of highly shielding light of a wavelength of 1,450 nm to 1,750 nm, and a heat ray-shielding film having sufficient strength can be obtained.

—Surface Modification of Inorganic Particles—

In view of improving affinity and binding properties with respect to a transparent resin and a transparent resin-forming component which will be described later, the surface of the inorganic particles is preferably modified with a surface modifier.

As the surface modifier, one kind or two or more kinds of surface modifiers selected from the group consisting of an alkoxysilane compound, a siloxane compound, and a surfactant are preferably used. Among these surface modifiers, a silane coupling agent is preferred as the alkoxysilane compound, modified silicone is preferred as the siloxane compound, and an anionic surfactant or a nonionic surfactant is particularly preferred as the surfactant. These surface modifiers can be appropriately selected according to the purpose.

In order to further improve the affinity or the binding properties with respect to a transparent resin, the surface modifier preferably has a functional group reactive with a transparent resin-forming component. In a case where the transparent resin-forming component is an acrylic resin, examples of the functional group include an acryl group, a methacryl group, an acryloyl group, an acryloyloxy group, a methacryloyloxy group, a vinyl or styryl group having an unsaturated bond, an epoxy group (glycidyl group), and the like. In a case where the transparent resin is a silicone-based resin-forming component, examples of the functional group include an alkenyl group (vinyl group) or an alkynyl (ethynyl group) group which is an unsaturated binding group, a hydrogen group (Si—H group), and the like. In a case where the transparent resin is an epoxy-based resin-forming component, examples of the functional group include an epoxy group (glycidyl group), a hydroxyl group, an amino group, and the like. One kind of these functional groups may be used singly, or two or more kinds thereof may be used in combination.

Examples of the silane coupling agent include 3-glycidoxypropyltrimethoxysilane, 3-glycidoxypropyltriethoxysilane, p-styryltrimethoxysilane, p-styryltriethoxysilane, 3-acryloxypropyltrimethoxysilane, 3-acryloxypropyltriethoxysilane, 3-methacryloxypropyltrimethoxysilane, 3-methacryloxypropyltriethoxysilane, allyl trimethoxysilane, allyl triethoxysilane, vinyl ethyl dimethoxysilane, vinyl ethyl diethoxysilane, 3-glycidoxypropylethyldimethoxysilane, 3-glycidoxypropyltriethyldiethoxysilane, p-styrylethyldimethoxysilane, p-styrylethyldiethoxysilane, 3-acryloxypropylethyldimethoxysilane, 3-acryloxypropylethyldiethoxysilane, 3-methacryloxypropylethyldimethoxysilane, 3-methacryloxypropylethyldiethoxysilane, allyl ethyl dimethoxysilane, allyl ethyl diethoxysilane, vinyl diethyl methoxysilane, vinyl diethyl ethoxysilane, 3-glycidoxypropyldiethylmethoxysilane, 3-glycidoxypropyldiethylethoxysilane, p-styryldiethylmethoxysilane, p-styryldiethylethoxysilane, 3-acryloxypropyldiethylmethoxysilane, 3-acryloxypropyldiethylethoxysilane, 3-methacryloxypropyldiethylmethoxysilane, 3-methacryloxypropyldiethylethoxysilane, allyl diethyl methoxysilane, allyl diethyl ethoxysilane, and the like.

Examples of the aforementioned modified silicone include methoxy-modified silicone, carboxy-modified silicone, alcohol-modified silicone, polyether-modified silicone, epoxy-modified silicone, mercapto-modified silicone, amino-modified silicone, methacrylate-modified silicone, methyl hydrogen silicone, and the like.

Examples of the aforementioned anionic surfactant include a sodium fatty acid such as sodium oleate, sodium stearate, or sodium laurate, a fatty acid-based compound such as potassium fatty acid or sodium fatty acid ester sulfonate, a phosphoric acid-based compound such as sodium alkyl phosphoric acid ester, an olefin-based compound such as sodium αolefin sulfonate, an alcohol-based compound such as sodium alkyl sulfate, an alkylbenzene-based compound, and the like.

Examples of the aforementioned nonionic surfactant include a fatty acid-based compound such as a polyoxyethylene lanolin fatty acid ester or a polyoxyethylene sorbitan fatty acid ester, polyoxyethylene alkyl phenyl ether, fatty acid alkanolamide, and the like.

One kind of the silane coupling agent, the modified silicone, the anionic surfactant, and the nonionic surfactant may be used singly, or two or more kinds thereof may be used in combination as long as they do not negatively affect each other.

The amount of the surface modifier used for modification is not particularly limited and can be appropriately selected, as long as the transparent resin composition satisfies the average light transmittance of the visible light region which will be described later, and the film obtained by curing the transparent resin composition satisfies the strength for practical use.

In a case where the surface modifier has a functional group reactive with a resin-forming component, the amount of the surface modifier used for modification is, with respect to the total mass of the inorganic particles, preferably 0.2% by mass or more and 30% by mass or less, more preferably 0.5% by mass or more and 20% by mass or less, and even more preferably 1% by mass or more and 15% by mass or less.

In a case where the surface modifier does not have a functional group reactive with a resin-forming component, the amount of the surface modifier used for modification is, with respect to the total mass of the inorganic particles, preferably 1% by mass or more and 15% by mass or less, more preferably 2% by mass or more and 10% by mass or less, and even more preferably 3% by mass or more and 7% by mass or less.

<Transparent Resin-Forming Component>

The transparent resin-forming component is a component for forming a transparent resin which will become a matrix material in the heat ray-shielding film which will be described later. The component is an uncured substance containing a monomer or an oligomer for forming a transparent resin and having fluidity.

The transparent resin refers to a resin having an average light transmittance, measured by the measurement method based on JIS K7361-1:1997, of 60% or more in the whole visible light region. The average light transmittance in the whole visible light region is preferably 70% or more and more preferably 80% or more.

The transparent resin is not particularly limited as long as it satisfies the light transmittance described above, and can be appropriately selected according to the purpose. For example, a thermosetting resin or an ultraviolet-curable resin can be used. Examples of the transparent resin include a phenol resin, a urea resin, a melamine resin, a polyurethane resin, an epoxy resin, a silicone resin, an acryl urethane-based resin, a polyester acrylate-based resin, an epoxy acrylate-based resin, and the like. One kind of these may be used singly, or two or more kinds thereof may be used in combination.

The transparent resin is preferably a colorless transparent resin having a light transmittance of 60% or more in the whole visible light region. According to the purpose, the transparent resin may be a colored transparent resin which has an average light transmittance of 60% or more in the whole visible light region but does not absorb light of a specific wavelength region within the visible light region.

<Other components>

Other components described above are not particularly limited as long as they are within the scope that does not depart from the gist of the present invention, and can be appropriately selected according to the purpose. Examples thereof include a solvent, a dispersant, a polymerization initiator, an antistatic agent, a refractive index regulator, an antioxidant, an ultraviolet absorber, a light stabilizer, a leveling agent, a defoamer, an inorganic filler, a coupling agent, a preservative, a plasticizer, a fluidity adjuster, a thickener, a pH adjuster, and the like.

—Solvent—

The solvent is not particularly limited, and can be appropriately selected according to the purpose. In view of the solubility of the aforementioned transparent resin-forming component, an organic solvent is preferable. Examples of the organic solvent include aliphatic hydrocarbons such as hexane, heptane, and cyclohexane, aromatic hydrocarbons such as toluene and xylene, alcohols such as methanol, ethanol, and propanol, halogenated hydrocarbons such as methylene chloride and ethylene chloride, ketones such as acetone, methyl ethyl ketone, methyl isobutyl ketone, 2-pentanone, and isophorone, esters such as ethyl acetate and butyl acetate, cellosolves such as ethyl cellosolve, ethers such as propylene glycol monomethyl ether and propylene glycol monoethyl ether, an amide-based solvent, an ether ester-based solvent, and the like. It is preferable to select solvents excellently dissolving the transparent resin-forming component among the above organic solvents. One kind of the organic solvent may be used singly, or two or more kinds thereof may be used in combination.

—Dispersant—

The aforementioned dispersant is not particularly limited and can be appropriately selected according to the purpose. Examples thereof include an anionic surfactant based on a sulfuric acid ester, a carboxylic acid, a polycarboxylic acid, and the like, cationic surfactants based on amines and the like, nonionic surfactants based on higher fatty acid polyethylene glycol ester and the like, silicone-based surfactants, fluorine-based surfactants, polymeric surfactants having an amide ester bond, and the like. One kind of these may be used singly, or two or more kinds thereof may be used in combination.

Examples of the amines include amine, amide, an amine-based dispersant, an amine-based surfactant, an amide-type monomer, an amine-based solvent, an amide-based solvent, and the like.

As an amine, any of primary, secondary, and tertiary amines may be used. These may be used by being mixed together, but it is preferable to use a tertiary amine.

As the amide-type monomer, for example, an acrylamide-type monomer or a methacrylamide-type monomer is suitably used. Examples of the amide-type monomer include hydroxyethyl acrylamide, hydroxyethyl methacrylamide, dimethyl aminopropyl acrylamide, dimethyl aminopropyl methacrylamide, N-[3-(dimethylamino)propyl]acrylamide, N-[3-(dimethylamino)propyl]methacrylamide, and the like.

—Polymerization Initiator—

The aforementioned polymerization initiator can be appropriately selected according to the type of the monomer and the oligomer used as the resin-forming component. In a case where a photocurable resin-forming component is used, a photopolymerization initiator is used. The type or amount of the photopolymerization initiator is appropriately selected according to the photocurable resin-forming component to be used. Examples of the photopolymerization initiator include photopolymerization initiators based on benzophenone, diketone, acetophenone, benzoin, thioxanthone, quinone, benzyl dimethyl ketal, alkyl phenone, acyl phosphine oxide, phenyl phosphine oxide, and the like. One kind of these may be used singly, or two or more kinds thereof may be used in combination.

—Thickener—

Examples of the aforementioned thickener suitably include natural water-soluble polymers such as gelatin, casein, collagen, hyaluronic acid, albumin, and starch, semi-synthetic polymers such as methyl cellulose, ethyl cellulose, methyl hydroxypropyl cellulose, carboxymethyl cellulose, hydroxymethyl cellulose, hydroxypropyl cellulose, sodium carboxymethyl cellulose, and alginic acid propylene glycol ester, synthetic polymers such as polyvinyl alcohol, polyvinyl pyrrolidone, carbomer (carboxyvinyl polymer), polyacrylate, and polyethylene oxide, inorganic minerals such as bentonite, laponite, and hectorite, and the like. One kind of these may be used singly, or two or more kinds thereof may be used in combination.

—Viscosity of Transparent Resin Composition—

In view of forming a film by coating a substrate, the viscosity of the transparent resin composition at a temperature of 25° C. is preferably 0.2 mPa·s or more and 500 mPa·s or less, and more preferably 0.5 mPa·s or more and 200 mPa·s or less.

In a case where the viscosity of the transparent resin composition is 0.2 mPa·s or more, the average thickness of the film is easily controlled. In a case where the viscosity of the transparent resin composition is 500 mPa·s or less, it is easy to handle the transparent resin composition.

The viscosity of the transparent resin composition is preferably adjusted by adding the thickener or solvent described above. Furthermore, the viscosity can be increased by partially polymerizing the transparent resin-forming component or by removing the solvent.

The viscosity can be measured by appropriately selecting a measurement instrument adequate for measuring the viscosity of the transparent resin composition. For example, an E-type viscometer manufactured by TOKI SANGYO CO., LTD and the like can be used.

—Light Transmittance of Transparent Resin Composition—

The light transmittance of the transparent resin composition can be measured by setting the average thickness of the components remaining after volatile components such as a solvent contained in the transparent resin composition are removed, that is, by setting the average thickness of nonvolatile components in the transparent resin composition to be a specific value.

The state in which the volatile components are removed refers to a state in which no weight change is observed in a case where a weight change over a time period during which the transparent resin composition is applied to a substrate and dried is measured.

Provided that the average thickness of the nonvolatile components in the transparent resin composition is 1.0 μm, the average light transmittance (visible light transmittance, VLT) of the nonvolatile component in the transparent resin composition within a visible light region is preferably 80% or more, more preferably 83% or more, and even more preferably 85% or more.

If the average light transmittance (visible light transmittance, VLT) of the nonvolatile component in the transparent resin composition within a visible light region is 80% or more, in a case where the heat ray-shielding film formed using the transparent resin composition is provided on the surface of front glass of automobiles, window glass of buildings, and the like, it is possible to prevent the reduction in the visible light transmittance of the front glass, the window glass, and the like and to sufficiently ensure transparency.

Provided that the average thickness of the transparent resin composition is 1.0 μm, the light transmittance of the nonvolatile components in the transparent resin composition at 1,450 nm to 1,750 nm is preferably 30% or less, more preferably 20% or less, even more preferably 10% or less, and still more preferably 5% or less.

Having a light transmittance of 30% or less at 1,450 nm to 1,750 nm means that the light transmittance for each wavelength is 30% or less in a wavelength band of 1,450 nm to 1,750 nm. In a wavelength band of 1,450 nm to 1,750 nm, the light transmittance of the transparent resin composition of the present embodiment is maximized at 1,450 nm. Therefore, the light transmittance at 1,450 nm may be 30% or less.

If the light transmittance that the nonvolatile components in the transparent resin composition is 30% or less at 1,450 nm to 1,750 nm, in a case where the heat ray-shielding film formed using the transparent resin composition is provided on the surface of front glass of automobiles, window glass of buildings, and the like, the bodily sensation such as scorching sensation is not caused to an extent that is equal to or higher than a value of quantitative parameter such as a shielding coefficient.

For example, a substrate which substantially transmits visible light and infrared light of a wavelength of 2,500 nm is coated with the transparent resin composition such that the average thickness of the coating becomes 1 μm after volatile components are removed, and then the substrate is thermally treated for about 1 minute to 10 minutes at 50° C. to 100° C. so as to obtain a transparent resin composition from which volatile components such as a solvent are removed.

By using the obtained transparent resin composition, the light transmittance can be measured. The light transmittance can be measured using a sample composed only of a substrate as a comparative object and using the aforementioned measurement sample by a measurement method based on Japan Industrial Standards JIS S3107:1998 by using a spectrophotometer (for example, U-4100 manufactured by Hitachi, Ltd or UV-3600 manufactured by Shimadzu Corporation).

The transparent resin composition can be obtained by a method of mechanically mixing together the transparent resin-forming component, the inorganic particles or inorganic particles having undergone surface modification described above, and the dispersant, the polymerization initiator, the solvent, and the like, which are used if necessary, by using a mixing device.

Examples of the mixing device include a stirrer, a rotation-revolution mixer, a homogenizer, an ultrasonic homogenizer, and the like.

(Heat Ray-Shielding Film)

The heat ray-shielding film of the present invention has a visible light transmittance of 70% or more, a light transmittance of 30% or less at a wavelength of 1,450 nm to 1,750 nm, and has a haze value of 5% or less. The heat ray-shielding film is suitably formed of the transparent resin composition.

The shape of the heat ray-shielding film is not particularly limited and can be appropriately selected according to the purpose. For example, the heat ray-shielding film has a shape obtained by forming a film by using the transparent resin composition, a shape obtained by laminating the transparent resin composition on a substrate, and the like.

A heat ray-shielding film according to a first aspect of the present invention is formed of a transparent resin complex obtained by curing the transparent resin composition.

The average thickness of the film is appropriately adjusted according to the use, but is preferably 0.01 μm or more and 20 μm or less and more preferably 0.5 μm or more and 10 μm or less.

A heat ray-shielding film according to a second aspect of the present invention is formed of a transparent resin complex obtained by curing the transparent resin composition and a substrate. The average thickness of the transparent resin complex is appropriately adjusted according to the use, but is preferably 0.01 μm or more and 20 μm or less and more preferably 0.5 μm or more and 10 μm or less. The heat ray-shielding film is manufactured by a step of applying the transparent resin composition onto a substrate and a step of curing the transparent resin composition applied onto the substrate. If necessary, the heat ray-shielding film is manufactured by a method including other steps.

The method for applying the transparent resin composition is not particularly limited, and can be appropriately selected according to the purpose. Examples thereof include general wet coating methods such as a bar coating method, a spin coating method, a spray coating method, an ink jet method, a dip coating method, a roll coating method, a gravure coating method, a reverse roll coating method, a knife coater method, a screen printing method, and a kiss coater method, and the like.

The method for curing the transparent resin composition can be appropriately selected according to the type of the transparent resin-forming component contained in the transparent resin composition.

For example, in a case where the transparent resin-forming component is a thermosetting resin, the composition can be cured by being heated at a temperature and for a time that is sufficient for curing the resin-forming component. In a case where the transparent resin-forming component is photocurable resin, the composition can be cured by being irradiated with light having energy sufficient for curing the resin-forming component for a predetermined time.

In a case where the transparent resin composition contains volatile components such as a solvent, it is preferable to remove the volatile components before the transparent resin composition is cured. Although the method for removing the volatile components can be appropriately selected, a thermal treatment performed in the atmosphere or under reduced pressure is preferable. The treatment condition is preferably about 1 minute to 10 minutes at 50° C. to 150° C.

The light curing the photocurable resin is not particularly limited as long as it cures the film. Examples thereof include energy rays such as ultraviolet rays, far infrared rays, near ultraviolet rays, infrared rays, X rays, γ rays, electron beams, proton beams, and neutron beams. Among the above energy rays, ultraviolet rays are preferable because a curing rate thereof is high and a device thereof is easily obtained and handled.

The method for irradiating the composition with ultraviolet rays is not particularly limited, and can be appropriately selected according to the purpose. Examples of the method include a method of irradiating the composition with ultraviolet rays with energy of 100 mJ/cm$^2$ to 3,000 mJ/cm$^2$ by using a high-pressure mercury lamp, a metal halide lamp, a xenon lamp, a chemical lamp or the like that emits ultraviolet rays of a wavelength band of 200 nm to 500 nm, and the like.

In the heat ray-shielding film, the inorganic particles contained in the transparent resin composition has undergone surface modification, and hence the affinity and the binding properties with respect to the transparent resin and the transparent resin-forming component are improved. Therefore, the inorganic particles are readily uniformly dispersed in the heat ray-shielding film, and consequently, the characteristics become uniform at all of the sites in the heat ray-shielding film. Accordingly, the refractive index in the plane of the heat ray-shielding film practically becomes uniform, and hence the occurrence of color variation in the heat ray-shielding film is inhibited. Furthermore, because the affinity or the binding properties of the inorganic particles with respect to the transparent resin are improved, peeling or the like does not occur in the interface between the transparent resin and the inorganic particles, and hence a heat ray-shielding film having high strength and high abrasion resistance can be obtained.

The aforementioned substrate may be a resin transmitting visible rays, and examples thereof include polyester, polyethylene (PE), polypropylene (PP), polyamide (PA), polyvinyl chloride (PVC), polycarbonate (PC), polyvinyl alcohol (PVA), polymethyl methacrylate (PMMA), polyethylene terephthalate (PET), polyvinylidene fluoride (PVDF), polytetrafluoroethylene (PTFE), polychlorotrifluoroethylene (PCTFE), and the like. Among these, in view of transparency, stability, costs, and the like, a polyester film is preferable. Among the above polyesters, polyethylene terephthalate (PET) film is more preferable.

The substrate may have a sheet shape or a film shape having flexibility, and preferably has a film shape.

The average thickness of the substrate can be appropriately selected according to the material thereof, the use of the heat ray-shielding film to be formed, and the like, but is preferably 25 μm or more and 200 μm or less, for example.

The heat ray-shielding film can be obtained by coating a substrate with the transparent resin composition by using a known coating method such as a general wet coating method including a bar coating method, a spin coating method, a spray coating method, an ink jet method, a dip coating method, a roll coating method, a gravure coating method, a reverse roll coating method, a knife coater method, a screen printing method, and a kiss coater method, and heating the composition or irradiating the composition with light such as ultraviolet rays.

In order to ensure visibility, the visible light transmittance of the heat ray-shielding film is preferably 70% or more, more preferably 75% or more, and even more preferably 80% or more. The visible light transmittance can be obtained by measuring the heat ray-shielding film by a measurement method based on Japan Industrial Standards JIS S3107:1998 by using a spectrophotometer (for example, U-4100 manufactured by Hitachi, Ltd or UV-3600 manufactured by Shimadzu Corporation).

Furthermore, in order not to impair the transparency, the haze (Hz) value is preferably 5.0% or less, more preferably 2.0% or less, and even more preferably 1.0% or less.

The haze value is a ratio (%) of diffuse transmittance to total light transmittance, and can be measured and obtained by the measurement method based on Japan Industrial Standards JIS K 7136 by using a haze meter such as NDH-2000 manufactured by NIPPON DENSHOKU INDUSTRIES CO., Ltd or HM-150 manufactured by MURAKAMI COLOR RESEARCH LABORATORY CO., Ltd.

In order to suppress the scorching sensation the body feels to an extent that is equal to or higher than a numerical value of quantitative parameter such as infrared light-shielding properties, particularly, a shielding coefficient, the light transmittance of the heat ray-shielding film at a wavelength of 1,450 nm to 1,750 nm is 30% or less, preferably 20% or less, more preferably 10% or less, and even more preferably 5% or less. The light transmittance at a wavelength of 1,450 nm to 1,750 nm can be measured by the measurement method based on Japan Industrial Standards JIS S3107:1998 as in measuring the aforementioned visible light transmittance.

In order for the haze (Hz) value to become 5% or less, the average dispersed-particle diameter of the inorganic particles contained in the heat ray-shielding film is preferably 500 nm or less, more preferably 200 nm or less, even more preferably 100 nm or less, and particularly preferably 50 nm or less.

Particularly, in a case where the average secondary particle diameter of the inorganic particles is 100 nm or less, the scattering of visible light caused by the inorganic particles is inhibited, and high transparency is easily realized. Although the lower limit of the average dispersed-particle diameter is not particularly specified, because it is practically difficult to obtain particle diameter having an average dispersed-particle diameter of less than 1 nm, the lower limit is generally 1 nm.

According to the present invention, it is possible to provide a transparent resin composition having a higher heat ray-shielding effect while ensuring high visible light transmittance and to provide a heat ray-shielding film.

Therefore, in a case where the heat ray-shielding film of the present invention is applied to the surface of front glass of automobiles, window glass of buildings, and the like, excellent transparency and abrasion resistance as well as sufficient heat-ray shielding properties are obtained.

In the present embodiment, the heat ray-shielding film having high abrasion resistance refers to a film in which a difference (ΔHz) between a haze value before the Taber test and a haze value after the Taber test is 10,0% or less in a case where the Taber abrasion test is performed based on Japan Industrial Standards JIS K 5600-5-9 "Taber abrasion test" by using an abrasive wheel CS-10F under the conditions of a load of 500 g and a number of revolutions of 50. ΔHz is more preferably 5.0% or less.

EXAMPLES

Hereinafter, examples of the present invention will be described, but the present invention is not limited to the examples.

Example 1

<Preparation and Evaluation of Inorganic Particles>

As inorganic particles, indium tin oxide (ITO) particles (F-ITO manufactured by DOWA HIGHTECH CO., LTD) were used.

The ITO particles were put into a glass tube and subjected to reductive calcination for 5 hours at 300° C. under a gas stream consisting of nitrogen and hydrogen at a mixing ratio of 97:3 (volume ratio), thereby adjusting the color. The ITO particles having undergone the reductive calcination were evaluated as below. The evaluation results are described below and in Table 1.

—Measurement of Color—

The color of the obtained ITO particles having undergone the reductive calcination was measured by the measurement method based on Japan Industrial Standards JIS Z-8781-4: 2013 by using a spectral colorimeter SE2000 manufactured by Konica Minolta, Inc. As a result of the measurement, the $L^*$ value and the $b^*$ value of the color in the Lab color space were found to be 42.3 and −16.8 respectively.

—Measurement of Specific Surface Area—

The specific surface area of the obtained ITO particles having undergone the reductive calcination was measured by the BET method by using BELSORP-miniII manufactured by Nippon Bel Corporation. As a result of the measurement, the specific surface area was found to be 26.4 $m^2/g$.

<Manufacturing of Inorganic Particle Dispersion>

7.5 parts by mass of a surface modifier (KBM-5103; manufactured by Shin-Etsu Chemical Co., Ltd.) formed of 3-acryloxypropyltrimethoxysilane, 0.75 parts by mass of alkyl dimethylamine, and 41.75 parts by mass of methyl isobutyl ketone (MIBK) as a solvent (dispersion medium) were added to 50 parts by mass of the ITO particles having undergone the reductive calcination, and the mixture was treated in a beads mill for 4 hours at a number of revolutions of 2,500 rpm by using glass beads having a diameter of 0.1 mm. Then, the glass beads were separated, thereby preparing an inorganic particle dispersion of Example 1.

<Preparation and Evaluation of Transparent Resin Composition>

20.1 parts by mass of a polyfunctional acrylate resin-forming component (NK HARD T-102; manufactured by SHIN-NAKAMURA CHEMICAL CO., LTD.) as an acrylic resin-forming component, 0.64 parts by mass of photopolymerization initiator (IRGACURE 907; manufactured by BASF SE), and 11 parts by mass of toluene as well as 15.66 parts by mass of MIBK as solvents were added to 52.6 parts by mass of the inorganic particle dispersion, and the mixture was thoroughly stirred, thereby obtaining a transparent resin composition of Example 1. The content of the ITO particles was 17.3% by volume with respect to the amount of non-volatile components in the transparent resin composition.

The transparent resin composition of Example 1 was evaluated as below. The evaluation results are described below and in Table 1.

—Measurement of Dispersed-Particle Diameter—

The particle diameter distribution of the inorganic particles in the obtained transparent resin composition of Example 1 was measured by a dynamic light scattering method by using Microtrac 9340-UPA manufactured by NIKKISO CO., LTD. The median value $d_{50}$ of the dispersed-particle diameters that was calculated from the obtained value of the particle diameter distribution was 16.9 nm.

—Measurement of Light Transmittance—

The light transmittance of the obtained transparent resin composition of Example 1 was measured by the measurement method based on Japan Industrial Standards JIS S3107:1998.

A glass plate having an average thickness of 3 mm was coated with the transparent resin composition, from which volatile components had been removed, by using a bar coater such that the average thickness of the coating became 1.0 μm and heated for 3 minutes at 80° C. such that volatile components were removed, and the obtained resultant was used as a measurement sample. The transmittance of light of a wavelength of 450 nm to 2,500 nm that was transmitted through the transparent resin composition and the glass plate in the measurement sample was measured using a U-4100 spectrophotometer manufactured by Hitachi, Ltd. The visible light transmittance (VLT) calculated from the measurement results was 85.5%, and the light transmittance at a wavelength of 1,450 nm was 1.5%. Within a wavelength band of 1,450 nm to 1,750 nm, the light transmittance for each wavelength was 1.5% or less.

—Measurement of Haze Value—

The haze value (Hz) of the transparent resin composition of Example 1 was measured by the measurement method based on Japan Industrial Standards JIS K 7136 by using a haze meter TC-1800 MK/II manufactured by NIPPON DENSHOKU INDUSTRIES CO., Ltd. As a result of the measurement, the haze value was found to be 0.4%.

<Preparation and Evaluation of Heat Ray-Shielding Film>

A PET film (T4300; manufactured by Toyobo CO., LTD) which will become a substrate was coated with the transparent resin composition of Example 1 by using a bar coater such that the average thickness of a transparent resin complex obtained after curing became 1.0 μm, and heated for 1 hour at 80° C. such that volatile components were removed. After being heated as described above, the substrate was exposed to ultraviolet rays with energy of 300 $mJ/cm^2$ by using a high-pressure mercury lamp (120 W/cm), thereby obtaining a heat ray-shielding film of Example 1 in which a transparent resin complex was formed on the PET substrate.

The heat ray-shielding film of Example 1 was evaluated as below. The evaluation results are described below and in Table 1.

—Measurement of Light Transmittance—

The light transmittance of the heat ray-shielding film of Example 1 was measured by the measurement method based on Japan Industrial Standards JIS S3107:1998.

By using a pressure-sensitive adhesive sheet, the heat ray-shielding film of Example 1 was bonded to a glass plate having an average thickness of 3 mm that is of the same type as the glass plate used for measuring the light transmittance of transparent resin composition of Example 1. The transmittance of light of a wavelength of 450 nm to 2, 500 nm that is transmitted through the heat ray-shielding film and the glass plate was measured using a U-4100 spectrophotometer manufactured by Hitachi, Ltd. The measurement results are shown in FIG. 1. The visible light transmittance (VLT) calculated from the measurement results was 85.7%, and the light transmittance at a wavelength of 1,450 nm was 1.4%. Within a wavelength band of 1,450 nm to 1,750 nm, the light transmittance for each wavelength was 1.4% or less.

—Measurement of Haze Value—

The haze value (Hz) of the heat ray-shielding film of Example 1 was measured by the measurement method based on Japan Industrial Standards JIS K 7136 by using a haze meter TC-1800MK/II manufactured by NIPPON DENSHOKU INDUSTRIES CO., Ltd. As a result of the measurement, the haze value was found to be 0.3%.

—Abrasion Resistance Test—

The heat ray-shielding film of Example 1 was subjected to the Taber abrasion test based on Japan Industrial Standards JIS K 5600-5-9 "Taber abrasion test" by using an abrasive wheel CS-10F under the condition of a load of 500 g and a number of revolutions of 50. Then, in the same manner as in "Measurement of haze value" described above, the haze value after the Taber test was measured. The difference ($\Delta$Hz) between a haze value before the Taber test and a haze value after the Taber test was calculated, and the abrasion resistance was evaluated based on the difference. The results are shown in Table 1. $\Delta$Hz was 3.1%.

In a case where $\Delta$Hz is 5% or less, the heat ray-shielding film can be evaluated as having excellent abrasion resistance.

Example 2

A transparent resin composition and a heat ray-shielding film of Example 2 were obtained by being manufactured in the same manner as in Example 1, except that instead of the ITO particles of Example 1 that were subjected to reductive calcination, ITO particles were used which had a color having an L* value of 42.6 and a b* value of −15.3 and had a specific surface area of 21.2 m$^2$/g. The obtained transparent resin composition and heat ray-shielding film of Example 2 were evaluated in the same manner as in Example 1. The evaluation results are described in Table 1.

Example 3

A transparent resin composition and a heat ray-shielding film of Example 3 were obtained by being manufactured in the same manner as in Example 1, except that instead of the ITO particles of Example 1 that were subjected to reductive calcination, ITO particles were used which had a color having an L* value of 40.9 and a b* value of −13.2 and had a specific surface area of 25.8 m$^2$/g. The obtained transparent resin composition and heat ray-shielding film of Example 3 were evaluated in the same manner as in Example 1. The evaluation results are described in Table 1 and FIG. 1.

Example 4

A transparent resin composition and a heat ray-shielding film of Example 4 were obtained by being manufactured in the same manner as in Example 1, except that instead of the ITO particles of Example 1 that were subjected to reductive calcination, ITO particles were used which had a color having an L* value of 41.5 and a b* value of −12.0 and had a specific surface area of 42.5 m$^2$/g. The obtained transparent resin composition and heat ray-shielding film of Example 4 were evaluated in the same manner as in Example 1. The evaluation results are described in Table 1.

Example 5

<Manufacturing of Inorganic Particle Dispersion>

As inorganic particles, the ITO particles of Example 1 that were subjected to reductive calcination were used.

2 parts by mass of a surface modifier (ADEKACOL CS-141E; manufactured by ADEKA CORPORATION) formed of a cyclic phosphoric acid ester and 0.67 parts by mass of a surface modifier (DISPERBYK-111; manufactured by BYK Japan KK.) formed of an acid group-containing copolymer were added to 50 parts by mass of the ITO particles having undergone the reductive calcination, and the mixture was treated in a beads mill by using glass beads having a diameter of 0.1 mm such that the surface of the ITO particles having undergone the reductive calcination was modified. 38.44 parts by mass of toluene as a solvent (dispersion medium) was added to the ITO particles having undergone the reductive calcination. Then, 6.04 parts by mass of a surface modifier (ASBD; manufactured by Kawaken Fine Chemicals Co., Ltd.) containing aluminum sec-butylate as a main component and 2.85 parts by mass of methyl acetoacetate as a chelating agent were further added thereto. The mixture was treated in a beads mill for 4 hours at a number of revolutions of 2,500 rpm by using glass beads having a diameter of 0.1 mm. Thereafter, the glass beads were separated, thereby preparing an inorganic particle dispersion of Example 5.

<Preparation and Evaluation of Transparent Resin Composition>

24.43 parts by mass of a polyfunctional acrylate resin-forming component (NK HARD T-102; manufactured by SHIN-NAKAMURA CHEMICAL Co., Ltd.) as an acrylic resin-forming component, 1.07 parts by mass of photopolymerization initiator (IRGACURE 907; manufactured by BASF SE), and 21.49 parts by mass of toluene as a solvent were added to 53 parts by mass of the inorganic particle dispersion of Example 5, and the mixture was thoroughly stirred, thereby obtaining a transparent resin composition of Example 5. The transparent resin composition of Example 5 was evaluated in the same manner as in Example 1. The content of the ITO particles was 16.46 by volume with respect to the amount of nonvolatile components in the transparent resin composition. The evaluation results are described in Table 1.

<Preparation and Evaluation of Heat Ray-Shielding Film>

A transparent resin composition and a heat ray-shielding film of Example 5 were obtained by being manufactured in the same manner as in Example 1, except that instead of the transparent resin composition of Example 1, the transparent resin composition of Example 5 was used. The obtained transparent resin composition and heat ray-shielding film of Example 5 were evaluated in the same manner as used for the transparent resin composition and heat ray-shielding film of Example 1. The evaluation results are described in Table 1.

Example 6

A transparent resin composition and a heat ray-shielding film of Example 6 were obtained by being manufactured in the same manner as in Example 1, except that instead of the ITO particles of Example 1 that were subjected to reductive calcination, ITO particles were used which had a color having an L* value of 37.1 and a b* value of −14.0 and had a specific surface area of 32.6 m$^2$/g. The obtained transparent resin composition and heat ray-shielding film of

Example 6 were evaluated in the same manner as in Example 1. The evaluation results are described in Table 1.

Example 7

A transparent resin composition and a heat ray-shielding film of Example 7 were obtained by being manufactured in the same manner as in Example 1, except that instead of the ITO particles of Example 1 that were subjected to reductive calcination, ITO particles were used which had a color having an L* value of 36.4 and a b* value of −13.7 and had a specific surface area of 32.9 m$^2$/g. The obtained transparent resin composition and heat ray-shielding film of Example 7 were evaluated in the same manner as in Example 1. The evaluation results are described in Table 1.

Example 8

A transparent resin composition and a heat ray-shielding film of Example 8 were obtained by being manufactured in the same manner as in Example 1, except that instead of the ITO particles of Example 1 that were subjected to reductive calcination, ITO particles were used which had a color having an L* value of 43.1 and a b* value of −12.3 and had a specific surface area of 41.2 m$^2$/g. The obtained transparent resin composition and heat ray-shielding film of Example 8 were evaluated in the same manner as in Example 1. The evaluation results are described in Table 1.

Example 9

A transparent resin composition and a heat ray-shielding film of Example 9 were obtained by being manufactured in the same manner as in Example 1, except that instead of the ITO particles of Example 1 that were subjected to reductive calcination, ITO particles were used which had a color having an L* value of 51.0 and a b* value of −14.7 and had a specific surface area of 24.3 m$^2$/g. The obtained transparent resin composition and heat ray-shielding film of Example 9 were evaluated in the same manner as in Example 1. The evaluation results are described in Table 1.

Example 10

A transparent resin composition and a heat ray-shielding film of Example 10 were obtained by being manufactured in the same manner as in Example 1, except that instead of the ITO particles of Example 1 that were subjected to reductive calcination, ITO particles were used which had a color having an L* value of 49.3 and a b* value of −16.0 and had a specific surface area of 24.3 m$^2$/g. The obtained transparent resin composition and heat ray-shielding film of Example 10 were evaluated in the same manner as in Example 1. The evaluation results are described in Table 1.

Example 11

A transparent resin composition and a heat ray-shielding film of Example 11 were obtained by being manufactured in the same manner as in Example 1, except that instead of the ITO particles of Example 1 that were subjected to reductive calcination, ITO particles were used which had a color having an L* value of 47.5 and a b* value of −13.1 and had a specific surface area of 21.8 m$^2$/g. The obtained transparent resin composition and heat ray-shielding film of Example 11 were evaluated in the same manner as in Example 1. The evaluation results are described in Table 1.

Example 12

A transparent resin composition and a heat ray-shielding film of Example 12 were obtained by being manufactured in the same manner as in Example 1, except that instead of the ITO particles of Example 1 that were subjected to reductive calcination, ITO particles were used which had a color having an L* value of 42.6 and a b* value of −10.0 and had a specific surface area of 24.7 m$^2$/g. The obtained transparent resin composition and heat ray-shielding film of Example 12 were evaluated in the same manner as in Example 1. The evaluation results are described in Table 1.

Comparative Example 1

A transparent resin composition and a heat ray-shielding film of Comparative Example 1 were obtained by being manufactured in the same manner as in Example 1, except that instead of the ITO particles of Example 1 that were subjected to reductive calcination, ITO particles (F-ITO; DOWA HIGHTECH CO., LTD) with a color having an L* value of 60.8 and a b* value of −13.1 were used without being subjected to reductive calcination. The obtained transparent resin composition and heat ray-shielding film of Comparative Example 1 were evaluated in the same manner as in Example 1. The evaluation results are described in Table 1 and FIG. 1.

Comparative Example 2

A transparent resin composition and a heat ray-shielding film of Comparative Example 2 were obtained by being manufactured in the same manner as in Example 1, except that instead of the ITO particles of Example 1 that were subjected to reductive calcination, ITO particles (subjected to reductive calcination performed using only nitrogen gas) with a color having an L* value of 61.4 and a b* value of −4.2 were used. The obtained transparent resin composition and heat ray-shielding film of Comparative Example 2 were evaluated in the same manner as in Example 1. The evaluation results are described in Table 1.

Comparative Example 3

A transparent resin composition and a heat ray-shielding film of Comparative Example 3 were obtained by being manufactured in the same manner as in Example 1, except that instead of the ITO particles of Example 1 that were subjected to reductive calcination, ITO particles (reduced to a higher degree by increasing the temperature of the reductive calcination) with a color having an L* value of 28.1 and a b* value of −8.1 were used. The obtained transparent resin composition and heat ray-shielding film of Comparative Example 3 were evaluated in the same manner as in Example 1. The evaluation results are described in Table 1.

Comparative Example 4

A transparent resin composition and a heat ray-shielding film of Comparative Example 4 were obtained by being manufactured in the same manner as in Example 5, except that instead of the ITO particles of Example 1 that were subjected to reductive calcination, the same ITO particles as in Comparative Example 1 were used. The obtained transparent resin composition and heat ray-shielding film of Comparative Example 4 were evaluated in the same manner as in Example 1. The evaluation results are described in Table 1.

TABLE 1

| | Characteristics of ITO particles | | | | Characteristics of transparent resin composition | | | Characteristics of heat ray-shielding film | | | |
|---|---|---|---|---|---|---|---|---|---|---|---|
| | L* | a* | b* | Specific surface area ($m^2$/g) | $d_{50}$ (nm) | Visible light transmittance (%) | Light transmittance at 1,450 nm (%) | Hz value (%) | Visible light transmittance (%) | Light transmittance at 1,450 nm (%) | Hz value (%) | Abrasion resistance |
| Example 1 | 42.3 | −5.0 | −16.8 | 26.4 | 16.9 | 85.5 | 1.5 | 0.4 | 85.7 | 1.4 | 0.3 | 3.1 |
| Example 2 | 42.6 | −6.1 | −15.3 | 21.2 | 18.1 | 85.1 | 1.2 | 0.6 | 85.3 | 1.1 | 0.4 | 2.8 |
| Example 3 | 40.9 | −5.9 | −13.2 | 25.8 | 16.4 | 84.3 | 1.4 | 0.3 | 84.6 | 1.2 | 0.3 | 2.9 |
| Example 4 | 41.5 | −7.0 | −12.0 | 42.5 | 20.3 | 85.5 | 1.5 | 0.4 | 85.7 | 1.3 | 0.3 | 2.9 |
| Example 5 | 42.3 | −5.0 | −16.8 | 26.4 | 48.8 | 85.9 | 4.3 | 1.1 | 85.8 | 4.4 | 0.9 | 4.5 |
| Example 6 | 37.1 | −6.6 | −14.0 | 32.6 | 15.6 | 85.2 | 1.3 | 0.4 | 85.4 | 1.2 | 0.3 | 3.0 |
| Example 7 | 36.4 | −6.9 | −13.7 | 32.9 | 16.1 | 85.4 | 1.4 | 0.5 | 85.5 | 1.2 | 0.4 | 3.3 |
| Example 8 | 43.1 | −6.2 | −12.3 | 41.2 | 22.5 | 84.9 | 1.1 | 0.7 | 85.0 | 1.0 | 0.5 | 3.1 |
| Example 9 | 51.0 | −6.4 | −14.7 | 24.3 | 16.9 | 86.5 | 21.0 | 0.9 | 86.4 | 20.8 | 0.8 | 3.3 |
| Example 10 | 49.3 | −5.7 | −16.0 | 24.3 | 18.2 | 86.6 | 19.9 | 1.2 | 86.4 | 19.7 | 1.0 | 3.4 |
| Example 11 | 47.5 | −5.2 | −13.1 | 21.8 | 17.3 | 86.5 | 11.9 | 0.7 | 86.3 | 11.8 | 0.6 | 3.1 |
| Example 12 | 42.6 | −4.8 | −10.0 | 24.7 | 17.7 | 85.5 | 8.2 | 0.8 | 85.3 | 7.9 | 0.7 | 3.0 |
| Comparative Example 1 | 60.8 | −7.2 | −13.1 | 26.8 | 21.2 | 86.5 | 44.0 | 0.5 | 86.8 | 43.8 | 0.4 | 4.2 |
| Comparative Example 2 | 61.4 | −9.6 | −4.2 | 27.4 | 22.3 | 86.2 | 58.2 | 0.7 | 86.1 | 57.3 | 0.9 | 4.8 |
| Comparative Example 3 | 28.1 | −4.4 | −8.1 | 20.9 | 20.9 | 68.2 | 4.7 | 1.1 | 68.0 | 4.8 | 1.0 | 4.3 |
| Comparative Example 4 | 60.8 | −7.2 | −13.1 | 26.8 | 51.3 | 85.5 | 47.2 | 1.4 | 85.5 | 43.3 | 1.1 | 5.9 |

As is evident from the results shown in Table 1 and FIG. 1, in the transparent resin compositions and the heat ray-shielding films of Examples 1 to 12 in which ITO particles with a color having an L* value of 30 to 55 and a b* value of −18 to −10 were used, while the visible light transmittance was 80% or more which is a high value, the light transmittance at 1,450 nm to 1,750 nm was 30% or less. These results showed that the heat ray-shielding film using ITO particles with a color having an L* value of 30 to 55 and a b* value of −18 to −10 has a low light transmittance at 1,450 nm to 1,750 nm and has high heat ray-shielding properties.

In contrast, in the transparent resin compositions and the heat ray-shielding films of Comparative Examples 1 to 4 in which ITO particles with a color having an L* value and a b* value at least either of which was out of the above range were used, the light transmittance at 1,450 nm was 40% or more which is a high value (Comparative Examples 1, 2, and 4), or the visible light transmittance was less than 70% which is a low value (Comparative Example 3). Therefore, all of the heat ray-shielding films of Comparative Examples 1 to 4 are inappropriate for being used as a heat ray-shielding film.

INDUSTRIAL APPLICABILITY

The transparent resin composition of the present invention can maintain high heat ray-shielding properties particularly for light in a wavelength region of 1,450 nm to 1,750 nm, and can maintain high visible light transmittance and high abrasion resistance. Therefore, the transparent resin composition of the present invention is suitable, for example, for films ref lecting•absorbing heat rays on front glass of automobiles or window glass of buildings.

The invention claimed is:

1. A transparent resin composition comprising:
   a transparent resin-forming component; and
   inorganic particles,
   wherein the inorganic particles contain indium tin oxide, whereas inorganic particles containing Sb-free F-doped tin oxide, hexaboride, or rhenium are excluded, and the inorganic particles have a color having an L* value of 30 or more and 55 or less and a b* value of −18 or more and −10 or less in a Lab color space, and
   in a case where volatile components of the transparent resin composition are removed and a measurement length is set to be 1 μm, a visible light transmittance is 80% or more, and a light transmittance is 10% or less at a wavelength of 1,450 nm to 1,750 nm.

2. The transparent resin composition according to claim 1, wherein a specific surface area of the inorganic particles is 20 $m^2$/g to 50 $m^2$/g.

3. The transparent resin composition according to claim 1, wherein a median value $d_{50}$ of dispersed-particle diameters of the inorganic particles is 200 nm or less.

4. The transparent resin composition according to claim 1, wherein a content of the inorganic particles is 5% by volume or more and 40% by volume or less with respect to an amount of nonvolatile components in the transparent resin composition.

5. A heat ray-shielding film comprising:
   a transparent resin-forming component; and
   inorganic particles,
   wherein the inorganic particles contain indium tin oxide, whereas inorganic particles containing Sb-free F-doped tin oxide, hexaboride, or rhenium are excluded, and the inorganic particles have a color having an L* value of 30 or more and 55 or less and a b* value of −18 or more and −10 or less in a Lab color space,
   a visible light transmittance is 70% or more,
   a light transmittance at a wavelength of 1,450 nm to 1,750 nm 10% or less, and
   a haze value is 5% or less.

* * * * *